B. C. KIXMILLER.
RAIL BOND.
APPLICATION FILED MAY 21, 1917.

1,260,913.

Patented Mar. 26, 1918.

Witness
D. Alexander
E. N. Major

Inventor
BRUCE C. KIXMILLER.
By Lockwood & Lockwood.
Attorneys

UNITED STATES PATENT OFFICE.

BRUCE C. KIXMILLER, OF BICKNELL, INDIANA.

RAIL-BOND.

1,260,915.

Specification of Letters Patent.

Patented Mar. 26, 1918.

Application filed May 21, 1917. Serial No. 169,943.

*To all whom it may concern:*

Be it known that I, BRUCE C. KIXMILLER, a citizen of the United States, and a resident of Bicknell, county of Knox, and State of Indiana, have invented a certain new and useful Rail-Bond; and I do hereby declare that the following is a full, clear, and exact description thereof, reference being had to the accompanying drawings, in which like letters refer to like parts.

This invention relates to a rail bond for electrically connecting two rails together at their joint. The present type of rail bond which is in common use requires the rails to be drilled and a stud inserted therein and spread so as to make a perfect contact with the rail, which studs are connected by a cable for conducting the current from one rail to another.

The main object of this invention is to construct a rail bond which can be used without drilling the rail and thus saving the expense and labor involved in drilling. The simple construction involved in this rail bond is such that it can be put on the rail by unskilled labor and in no way would be affected by the car wheel, as it would be out of the way thereof. It can also be taken off of the rail and be used in other places with a minimum expenditure of time and material, whereas the old type of rail bond could not be used over again.

From the construction of this rail bond which will be hereinafter more fully shown and described it is apparent that it may be quickly attached to or removed from the rails, which makes it especially adapted to use on temporary structures, besides rendering the same service on permanent structures as the old type of rail bond.

Figure 1:
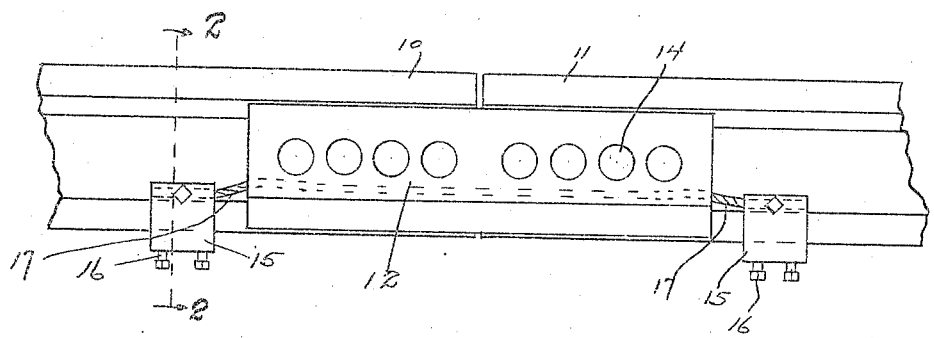
Figure 2:
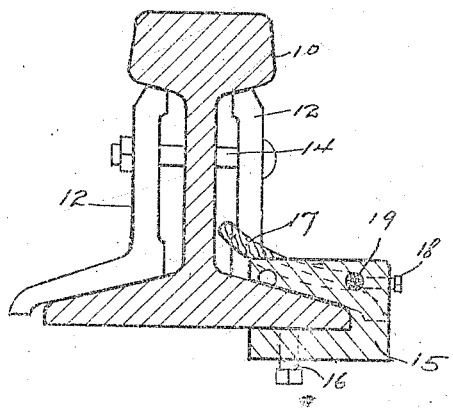
Figure 3:
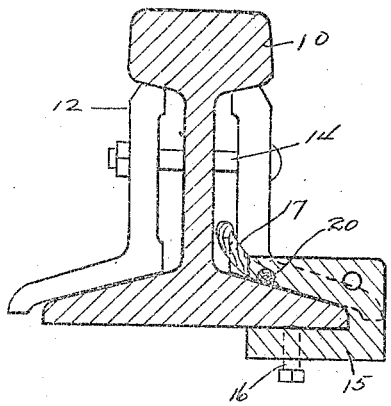

The full nature of the invention will be understood from the accompanying drawings and the following description and claim:

Figure 1 is a side elevation showing a portion of two rails at their joints with the rail bond in fixed position. Fig. 2 is a cross section taken on the line 2—2 of Fig. 1. Fig. 3 is the same as Fig. 2 showing a modified form thereof.

In the drawings there is shown a rail 10 adapted to be joined or connected to a rail 11 by the fish plates 12 secured in place by the bolts 14, all of which is of the ordinary construction. In order to electrically connect the rails 10 and 11 to each other there are provided two rail bond clamping members 15 adapted to straddle one side of the web of the rails and be clamped thereto by the set screws 16, so as to be securely fixed to said rails. There is a bond or cable 17 adapted to extend between the fish plate 12 and the rails as shown in Fig. 1, and be secured in said clamping member 15 so as to make perfect contact, by the set screw 18 which engages and clamps the bond or cable in the hole 19 extending through said clamping member. Said clamping member is made of conducting material such as copper, steel or iron, so that the current may be readily conducted from one rail to the other through the clamping members and the bond or cable.

A modified form is shown in Fig. 3 wherein the bond or cable 17 is clamped directly on the web of the rails by the clamping members 15. For this purpose there is a groove 20 of less diameter than the bond 17 into which said bond extends longitudinally so that the lower surface thereof will lie adjacent and make contact with the upper surface of the web of the rail, and be clamped thereon by the pressure exerted by the set screws 16, whereby the current will pass directly from one rail to the other through the bond instead of passing through the clamping member.

In view of the above it may readily be seen that the rail bond can be quickly and easily attached to the rails or removed therefrom and used on other rails as desired, whereas other rail bonds are permanently fixed to the rails.

The invention claimed is:

In a rail bond, the combination with a pair of rails and fish plates for securing said rails together, of a cable extending between one of said fish plates and said rails, a clamping member at each end of said fish plate having a horizontally extending recess for receiving one edge of the base of the rail, said clamping members having openings for the reception of the ends of the cable, means to secure the cables in the openings, and set screws extending upwardly through the clamping members and into engagement with the rail base for locking the clamping members in engagement with the rails.

In witness whereof, I have hereunto affixed my signature.

BRUCE C. KIXMILLER.